(12) United States Patent
Van Lieshout et al.

(10) Patent No.: US 11,290,899 B2
(45) Date of Patent: *Mar. 29, 2022

(54) MEASUREMENT IN MBMS

(71) Applicant: Samsung Electronics Co., Ltd, Suwon-si (KR)

(72) Inventors: Gert-Jan Van Lieshout, Apeldoorn (NL); Himke Van Der Velde, Zwolle (NL); Boon Loong Ng, Richardson, TX (US); Sangbum Kim, Suwon-si (KR); Thomas David Novlan, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 75 days.

This patent is subject to a terminal disclaimer.

(21) Appl. No.: 16/719,817

(22) Filed: Dec. 18, 2019

(65) Prior Publication Data

US 2020/0128419 A1   Apr. 23, 2020

Related U.S. Application Data

(63) Continuation of application No. 16/002,886, filed on Jun. 7, 2018, now Pat. No. 10,555,196, which is a
(Continued)

(30) Foreign Application Priority Data

Jan. 31, 2014   (GB) ...................... 1401726

(51) Int. Cl.
*H04W 24/08* (2009.01)
*H04L 43/08* (2022.01)
(Continued)

(52) U.S. Cl.
CPC .......... *H04W 24/08* (2013.01); *H04L 12/189* (2013.01); *H04L 43/08* (2013.01); *H04L 51/38* (2013.01); *H04W 24/10* (2013.01); *H04W 4/06* (2013.01)

(58) Field of Classification Search
None
See application file for complete search history.

(56) References Cited

U.S. PATENT DOCUMENTS 10,015,687 B2 * 7/2018 Van Lieshout ....... H04W 24/10
10,555,196 B2 * 2/2020 Van Lieshout ....... H04L 12/189
(Continued)

FOREIGN PATENT DOCUMENTS

CN    102215455 A    10/2011
CN    102611989 A    7/2012
(Continued)

OTHER PUBLICATIONS

Huawei, HiSilicon, "Discussion on UE measurements for MBMS", 3GPP TSG RAN WG1 Meeting #74bis, Oct. 7-11, 2013, R1-134351, 4 pages.
(Continued)

*Primary Examiner* — Kouroush Mohebbi

(57) ABSTRACT

Drive testing for network optimization has been supplemented by the use of information measuring radio conditions collected by mobile terminals (i.e. UEs). To improve the user experience of multicast and broadcast services based on cellular telecommunications networks, such as MBMS and eMBMS, a mechanism is described that adapts UE-based reporting of measurement reports to multicast and broadcast services.

20 Claims, 11 Drawing Sheets

Related U.S. Application Data continuation of application No. 14/610,985, filed on Jan. 30, 2015, now Pat. No. 10,015,687.

(51) Int. Cl.
*H04L 12/18* (2006.01)
*H04W 24/10* (2009.01)
*H04L 51/58* (2022.01)
*H04W 4/06* (2009.01)

(56) References Cited

U.S. PATENT DOCUMENTS

| | | | |
|---|---|---|---|
| 2011/0243056 A1 | 10/2011 | Jen | |
| 2013/0010624 A1* | 1/2013 | He | H04L 41/5032 370/252 |
| 2013/0095838 A1* | 4/2013 | Uemura | H04W 36/0085 455/443 |
| 2013/0128756 A1 | 5/2013 | Zhang et al. | |
| 2013/0128765 A1 | 5/2013 | Yang et al. | |
| 2013/0301509 A1* | 11/2013 | Purnadi | H04W 36/0083 370/312 |
| 2014/0056169 A1 | 2/2014 | Jung et al. | |
| 2014/0220982 A1 | 8/2014 | Jung et al. | |

FOREIGN PATENT DOCUMENTS

| | | |
|---|---|---|
| EP | 2528270 A1 | 11/2012 |
| EP | 2894895 A1 | 7/2015 |
| EP | 2958362 A1 | 12/2015 |
| WO | 2012/148203 A2 | 11/2012 |
| WO | 2013/005904 A1 | 1/2013 |
| WO | 2013/051837 A1 | 4/2013 |
| WO | 2014/168384 A1 | 10/2014 |

OTHER PUBLICATIONS

Decision of Patent dated Oct. 21, 2020 in connection with Korean Patent Application No. 10-2015-0015888, 4 pages.
International Search Report dated May 11, 2015 in connection with International Application No. PCT/KR2015/001064; 4 pages.
Combined Search and Examination Report Under Sections 17 and 18(3) dated Apr. 24, 2014 in connection with United Kingdom Application No. GB1401726.3; 6 pages.
Samsung; "Discussion on Measurements for Further MBMS Operations Support"; 3GPP TSG-RAN WG1#75 R1-135207; San Francisco, CA; Nov. 11-15, 2013; 3 pages.
Alcatel-Lucent; "MBMS Measurements for Further Enhancement of MBMS Operation"; 3GPP TSG RAN WG1 Mtg#75; R1-35839 (Rev R1-135164); San Francisco, CA; Nov. 11-15, 2013; 4 pages.
Examination Report Under Section 18(3) dated May 23, 2016 in connection with United Kingdom Application No. GB1401726.3; 3 pages.
3GPP TS 36.331 V11.6.0, "3rd Generation Partnership Project; Technical Specification Group Radio Access Network Evolved Universal Terrestrial Radio Access (E-UTRA); Radio Resource Control (RRC); Protocol specification (Release 11)", Dec. 2013, 347 pages.
Catt, "Stage 2 Issues for Further MBMS Operations Support," 3GPP TSG RAN WG2 Meeting #85, R2-140137, Prague, Czech Republic, Feb. 10-14, 2014, 6 pages.
Samsung, "Introducing eMBMS measurement," 3GPP TSG-RAN2#85 meeting, R2-140598, Prague, Czech Republic, Feb. 10-14, 2014, 4 pages.
Communication from foreign patent office in counterpart foreign application, European Patent Office, "Supplementary European Search Report," Application No. EP 15 74 3806, Jul. 12, 2017, 13 pages.
3GPP TS 36.331 V12.0.0, "3rd Generation Partnership Project; Technical Specification Group Radio Access Network Evolved Universal Terrestrial Radio Access (E-UTRA); Radio Resource Control (RRC); Protocol specification," Technical Specification, Release 12, Dec. 2013, 349 pages.
Office Action dated Mar. 4, 2019 in connection with Chinese Patent Application No. 201580006813.4, 16 pages.
LG Electronics, "Considerations on MBSFN UE measurement", 3GPP TSG RAN WG1 Meeting #75, Nov. 11-15, 2013, R1-135470, 3 pages.
Communication pursuant to Article 94(3) EPC dated Nov. 19, 2019 in connection with European Patent Application No. 15 743 806.0, 8 pages.

\* cited by examiner

FIG. 8

```
AreaConfiguration-r10 ::=          CHOICE {
        cellGlobalIdList-r10                CellGlobalIdList-r10
        trackingAreaCodeList-r10            TrackingAreaCodeList-r10
}

AreaConfiguration-v1130 ::=        SEQUENCE {
        trackingAreaCodeList-v1130          TrackingAreaCodeList-v1130
}

AreaConfiguration-v12xy ::=        SEQUENCE {
        cellGlobalIdList-r12                CellGlobalIdList-r10
                      OPTIONAL,
        mbsfn-AreaIdList-r12                MBSFN-AreaIdList-r12
                      OPTIONAL,
}

CellGlobalIdList-r10 ::=           SEQUENCE (SIZE (1..32)) OF CellGlobalIdEUTRA

TrackingAreaCodeList-r10 ::=       SEQUENCE (SIZE (1..8)) OF TrackingAreaCode

TrackingAreaCodeList-v1130 ::= SEQUENCE {
        plmn-Identity-perTAC-List-r11     SEQUENCE (SIZE (1..8)) OF PLMN-Identity
}
```

FIG. 9A

```
LoggedMeasurementConfiguration-r10 ::=    SEQUENCE {
        criticalExtensions                              CHOICE {
                c1
                CHOICE {
                                loggedMeasurementConfiguration-r10
        LoggedMeasurementConfiguration-r10-IEs,
                                spare3 NULL, spare2 NULL, spare1 NULL
                },
                criticalExtensionsFuture              SEQUENCE {}
        }
}
LoggedMeasurementConfiguration-r10-IEs ::= SEQUENCE {
        traceReference-r10                      TraceReference-r10
        traceRecordingSessionRef-r10            OCTET STRING (SIZE (2)),
        tce-Id-r10                              OCTET STRING (SIZE (1)),
        absoluteTimeInfo-r10                    AbsoluteTimeInfo-r10,
        areaConfiguration-r10                   AreaConfiguration-r10
OPTIONAL,   -- Need OR
        loggingDuration-r10                     LoggingDuration-r10,
        loggingInterval-r10                     LoggingInterval-r10,
        nonCriticalExtension
        LoggedMeasurementConfiguration-v1080-IEs OPTIONAL -- Need OP
}
LoggedMeasurementConfiguration-v1080-IEs ::= SEQUENCE {
        lateNonCriticalExtension-r10            OCTET STRING
                OPTIONAL,                       -- Need OP
        nonCriticalExtension
        LoggedMeasurementConfiguration-v1130-IEs OPTIONAL -- Need OP
}
- - - - - - - - - - - - - - CONTINUED - - - - - - - - - - - - - -
```

FIG. 9B

```
LoggedMeasurementConfiguration-v1130-IEs ::= SEQUENCE {
        plmn-IdentityList-r11                    PLMN-IdentityList3-r11
                        OPTIONAL,        -- Need OR
        areaConfiguration-v1130          AreaConfiguration-v1130      OPTIONAL,
        -- Need OR
        nonCriticalExtension                     SEQUENCE {}
                        OPTIONAL,        -- Need OR
}
LoggedMeasurementConfiguration-v12xy-IEs ::= SEQUENCE {
        loggedMeasurementObject-r11      CHOICE {
                        eMBMS
        SEQUENCE {
                                         mbsfn-AreaToLogList-r12      MBSFN-
AreaToLogList-r12
                        }
        }
}
MBSFN-AreaToLogList-r12 ::= SEQUENCE (SIZE(1..maxMBSFN-AreaLog)) OF MBSFN-AreaToLog-r12
MBSFN-AreaToLogList-r12 ::= SEQUENCE {
        freq                                                     ARFCN-
ARFCN-ValueEUTRA,
        mbsfn-AreaIdList-r12                     MBSFN-AreaIdList-r12,
        mch-List-r12                             MCH-List-r12
                        OPTIONAL,        --NEED OR
        logSignalling-r12                        ENUMERATED {true}
                        OPTIONAL,        --NEED OR
}
```

FIG. 10

```
LogMeasInfo-r10 ::=              SEQUENCE {
            locationInfo-r10                    LocationInfo-r10
                      OPTIONAL,
            relativeTimeStamp-r10               INTEGER (0..7200),
            servCellIdentity-r10                CellGlobalIdEUTRA,
            measResultServCell-r10              SEQUENCE {
                      rsrpResult-r10                              RSRP-Range,
                      rsrpResult-r10                              RSRP-Range,
            },
            measResultNeighCells-r10            SEQUENCE {
                      measResultListEUTRA-r10             MeasResultList2EUTRA-r9    OPTIONAL,
                      measResultListUTRA-r10
            MeasResultList2UTRA-r9 OPTIONAL,
                      measResultListGERAN-r10             MeasResultList2GERAN-r10   OPTIONAL,
                      measResultListCDMA2000-r10
            MeasResultList2CDMA2000-r9 OPTIONAL
            } OPTIONAL,
            ...
            [[ measResultListEUTRA-v1090
            MeasResultList2EUTRA-v9e0 OPTIONAL
            ]],
            [[ measResultListMBMS-r12
            MeasResultListMBMS-r12  OPTIONAL
            ]]
}

MeasResultListMBMS-r12 ::=      SEQUENCE (SIZE (1..maxMBSFN-Area)) OF
MeasResultMBSFN-Area-r12

MeasResultMBSFN-Area-r12 ::=    SEQUENCE {
            carrierFreq-r12          ARFCN-ValueEUTRA,
            mbsfn-AreaId-r12                    INTEGER (0..255),
            mbsfn-AreaId-r12                    INTEGER (0..255),
            rsrpResult-r12                      RSRP-Range,
            rsrqResult-r12                      RSRQ-Range,
            controlBLER-r12          BLER-Range-r12,
            dataBLER-PerMCHList-r12  DataBLER-PerMCHList-r12
}

DataBLER-PerMCHList-r12 ::=  SEQUENCE (SIZE (1..maxMCH)) OF BLER-Range-r12
```

MEASUREMENT IN MBMS

CROSS-REFERENCE TO RELATED APPLICATIONS

This application is a continuation of U.S. patent application Ser. No. 16/002,886 filed on Jun. 7, 2018, which is a continuation of U.S. patent application Ser. No. 14/610,985 filed on Jan. 30, 2015 now U.S. Pat. No. 10,015,687 issued Jul. 3, 2018, which claims priority under 35 U.S.C. § 119 to British Patent Application No. 1401726.3 filed on Jan. 31, 2014, the disclosures of which are herein incorporated by reference in their entirety.

TECHNICAL FIELD

The present application relates to the provision of measurement information in multicast/broadcast systems. In particular, certain embodiments of the present application relate to the provision of measurement information for Multimedia Broadcast Multicast Services, MBMS, in a 3rd Generation Partnership Project (3GPP) Long Term Evolution (LTE) or LTE Advanced compliant mobile communications network comprising a mobile terminal (also referred to herein as the User Equipment, UE) and network equipment.

BACKGROUND

Wireless or mobile (cellular) communications networks in which a mobile terminal (UE, such as a mobile handset) communicates via a radio link to a network of base stations (referred to variously as E-UTRAN Node B, eNodeBs eNBs) or other wireless access points connected to a telecommunications network, have undergone rapid development through a number of generations. Base stations serve one or more "cells", which define respective geographic areas of radio access coverage. Cells in turn are typically split into sectors. The initial deployments of systems using analogue signaling were superseded by Second Generation (2G) digital systems such as Global System for Mobile communications (GSM), which typically use a radio access technology known as GSM Enhanced Data rates for GSM Evolution Radio Access Network (GERAN), combined with an improved core network.

Second generation systems have themselves been largely replaced by or augmented by Third Generation (3G) digital systems such as the Universal Mobile Telecommunications System (UMTS), which uses a Universal Terrestrial Radio Access Network (UTRAN) radio access technology and a similar core network to GSM. UMTS is specified in standards produced by 3GPP. Third generation standards provide for a greater throughput of data than is provided by second generation systems. This trend is continued with the move towards Fourth Generation (4G) systems.

3GPP design, specify and standardize technologies for mobile wireless communications networks. Specifically, 3GPP produces a series of Technical Reports (TR) and Technical Specifications (TS) that define 3GPP technologies. The focus of 3GPP is currently the specification of standards beyond 3G, and in particular an Evolved Packet System (EPS) offering enhancements over 3G networks, including higher data rates. The set of specifications for the EPS comprises two work items: Systems Architecture Evolution (SAE, concerning the core network) and LTE concerning the air interface. The first set of EPS specifications were released as 3GPP Release 8 in December 2008. LTE uses an improved radio access technology known as Evolved UTRAN (E-UTRAN), which offers potentially greater capacity and additional features compared with previous standards. SAE provides an improved core network technology referred to as the Evolved Packet Core (EPC). Despite LTE strictly referring only to the air interface, LTE is commonly used to refer to the whole of the EPS, including by 3GPP themselves. LTE is used in this sense in the remainder of this specification, including when referring to LTE enhancements, such as LTE Advanced. LTE is an evolution of UMTS and shares certain high level components and protocols with UMTS. LTE Advanced offers still higher data rates compared to LTE and is defined by 3GPP standards releases from 3GPP Release 10 up to and including 3GPP Release 12. LTE Advanced is considered to be a 4G mobile communication system by the International Telecommunication Union (ITU).

Multicast and broadcast user services, where the services can be supplied to more than one user simultaneously, are facilitated by Multimedia Broadcast Multicast Services, MBMS, in LTE. MBMS was introduced as a component of E-UTRAN where the standard specified support for the delivery of broadcast services such as the transmission of television services and the transmission of multimedia content (e.g. audio, video, still images, text, etc.). While MBMS is a user service that employs a broadcast mechanism at the radio interface, the provision of security features can ensure that only particular UEs receive a service (i.e. UEs belonging to a multicast group). An area in which data of a specified MBMS service is transmitted (when such data is scheduled for transmission) is referred to as an MBMS service area: note that a single MBMS service area corresponds to an aggregation of one or more discrete geographic areas.

MBMS has been developed from its E-UTRAN/UMTS roots to allow the synchronization of the delivery of multicast user services across a plurality of cells. The introduction of MBMS over Single Frequency Network (MBSFN) means that it is possible to simultaneously transmit identical data streams across more than one cell using the same radio frequency (if) carrier: with MBSFN, identical content (control and payload) is transmitted at substantially the same time across the or each participating cell. MBSFN has been configured to make exclusive use of the radio resources for certain subframes within each radio frame.

MBSFN relies upon synchronization between an MBMS service center and each base station providing a participating cell and a SYNC protocol has been specified (in 3GPP TS 25.446). A group of base stations can be synchronized to define an MBSFN Synchronization Area: each MBSFN Synchronization Area can support one or more MBSFN Areas (i.e. groups of cells within the MBSFN Synchronization Area that, together, provide an MBSFN transmission for a given MBMS service). It is possible that a given cell can provide support for up to eight different MBSFN Areas allowing the concurrent broadcast of a plurality of MBMS services. Furthermore, a single MBSFN area can also support more than one service.

From 3GPP Release 10, a counting procedure has been introduced in MBMS to allow the network to quantify the number of active UEs in each cell that are receiving (or interested in receiving) a given MBMS service via a multicast bearer, MRB, (described in 3GPP TS 36.443). Further enhancements were introduced in Release 11 to accommodate improved service continuity for MBMS services.

Since MBMS is a multicast/broadcast system that provides the same information to multiple users, the data rate that is possible in any MBSFN area is limited by the radio link conditions for the MBSFN transmission at the worst placed UE, as no user-specific adaptation of transmission parameters is available.

In cellular networks generally, there is a constant effort to optimize the radio network while increasing data rate. In the initial radio network configuration or optimization stage, a base station or a base station controller should collect (i.e. measure) radio environment information related to its own cell coverage. The measurement of radio environment information assists in network planning and accurate empirical modelling of coverage. Typically, operators of mobile networks have driven (or otherwise transported) vehicles equipped with radio measurement apparatus over geographical areas of interest while performing the measurement task repeatedly. The measurement result is used to configure the system parameters of the base stations or base station controllers, even to identify potential sites for new base station installations. Use of vehicles in this manner is known as "drive testing". While road (or waterway) systems often coincide with population centers, this has meant that network planning has been incomplete and/or potentially biased by accessibility. Furthermore, as such vehicles need suitably trained personnel and can only occupy a limited number of locations over a measurement period, drive testing is considered to be comparatively time consuming and expensive: drive testing increases total costs and time of the radio network optimization and maintenance.

Study on minimization of drive tests and enhancement of radio environment analysis process and manual configuration was conducted under the name of Minimization of Drive Test (MDT) and the 3GPP RAN2 Working Group introduced support for Minimization of Drive Tests in release 10 of the 3GPP standards. This introduced a framework governing the provision of measurement reports by the UEs of consenting subscribers; discussed in detail in technical specification: 3GPP TS 37.320: "UTRA and E-UTRA; Radio measurement collection for Minimization of Drive Tests (MDT); Overall description; Stage 2". The MDT framework allows the operator to gather measurement information similar to that obtained by drive testing from UEs in the relevant geographic area(s).

To allow the network operator to optimize network provision of MBMS services and to ensure that the or each service can be received at an acceptable Quality of Service within the entire service area, it is therefore helpful to model the experience of UEs in the network using empirical data.

The E-UTRA specifications include two mechanisms (also referred to as "modes") by which UEs can provide measurement results to the network: Logged MDT and Immediate MDT.

In Immediate MDT, a UE in connected mode can be configured to perform measurements and to report the results either periodically or when a certain event condition occurs.

Alternatively, in Logged MDT, a UE can be configured to log available results of measurements performed in while in idle mode, which the network can retrieve at a later point in time.

By contrast with drive testing, in MDT, User Equipment (UE) measures radio channels and reports the radio channel measurement information to an evolved Node B (eNB). The report may be immediate or deferred: deferred delivery may occur at predetermined intervals, immediately in response to a specific event, or after a predetermined time has elapsed from the time when the radio channel measurement information has been recorded. The process in which the UE transmits the radio channel measurement information and other supplementary information to the eNB is called MDT measurement information reporting. In certain embodiments, reporting may be delayed depending upon the state of connection between the UE and the eNB, so that the UE reports the channel measurement result after the completion of channel measurement provided the communication is available with the eNB (i.e. the UE is in connected mode) but delays the report while the communication is not available with the eNB (i.e. the UE is in idle state) until the connection to the eNB is recovered.

The eNB uses the MDT measurement information received from the UE for cell coverage optimization. RAN procedures are generally specified in a manner agnostic of the purpose for which E-UTRAN applies them (i.e. the usage is up to E-UTRAN implementation). For connected mode, the existing signaling procedures were largely reused with minimal extension, while for idle mode all procedures for supporting measurement logging and their retrieval were introduced from scratch.

To obtain measurement data, two categories of MDT operation are envisaged: an area based MDT and a signaling based MDT. In the former, the measurement data is gathered from all UEs of consenting subscribers within a predetermined geographical area (defined using a cell list, tracking area etc.). In the latter, specific UEs are addressed (using a unique identifier such as an IMSI, IMEI etc.) and requested to signal measurement results.

While the MDT framework is specified for E-UTRAN, there is no facility that would permit a network operator to gather any MBMS measurement information from UEs that would assist in ensuring that the service can be received properly within one or more MBMS service areas.

SUMMARY

To address the above-discussed deficiencies, it is a primary object to provide a MBMS measurement facility capable of logging and/or signalling measurement information corresponding to MBMS services using available UEs.

In accordance with certain embodiments, there is provided a method of providing Multimedia Broadcast Multicast Services, MBMS, measurement information to a base station from a user equipment, UE, the method comprising: receiving configuration information setting conditions under which the UE is requested to perform MBMS measurements; performing requested MBMS measurements to generate MBMS measurement information; and, where MBMS measurement information has been generated, transmitting at least one reporting message including at least a portion of said MBMS measurement information to the base station at a first time, wherein the MBMS measurement information includes MBMS measurement results for a service area corresponding to a service area identifier; the MBMS measurement results including a block error rate, BLER, measurement.

Certain embodiments thus provide a facility for efficiently gathering and signaling MBMS measurements at UEs.

In accordance with certain other embodiments, there is provided a user equipment, UE, for providing MBMS measurement information to a base station, the UE comprising: a transceiver for communicating with the base station, the transceiver being adapted to receive configuration information setting conditions under which the UE is requested to perform MBMS measurements; and a controller for performing requested MBMS measurements to generate MBMS measurement information in accordance with said configuration information, and controlling the transceiver to transmit at least one reporting message including at least a portion of said MBMS measurement information to the base station at a first time, wherein the MBMS measurement information includes MBMS measurement results for a service area corresponding to a service area identifier; the MBMS measurement results including a block error rate, BLER, measurement.

In accordance with yet other embodiments, there is provided a computer program comprising instructions arranged, when executed, to implement the method outlined above. A further aspect provides machine-readable storage storing such a program.

Various respective aspects and features of certain embodiments are defined in the appended claims.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 shows an example extract of the ASN.1 according to this disclosure;

FIGS. 9A and 9B show further example extracts of the ASN.1 according to this disclosure; and FIG. 10 shows yet another example extract of the ASN.1 according to this disclosure.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system or device. While the following description illustrates embodiments implemented in the LTE architecture, the skilled reader will readily appreciate that it applies equally to other radio access technology architectures. In particular, as UMTS architecture also provides for MDT and MBMS, references to LTE technology below should be understood to relate to both LTE and UMTS technologies where the underlying procedures do not differ significantly.

Figure 1:
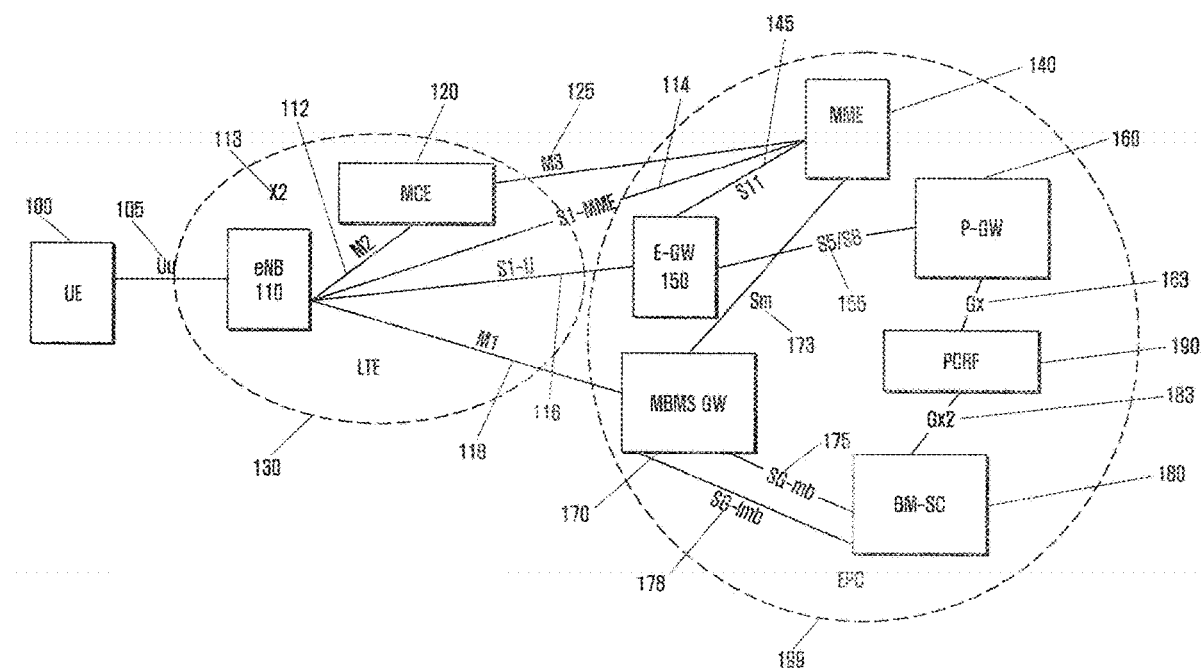
FIG. 1 illustrates a network architecture implementing MBMS in an LTE network according to this disclosure.

An overview of an architecture implementing MBMS in an LTE network is shown in FIG. 1. As for a generic LTE network, the MBMS architecture comprises three high level components: at least one UE 100, the E-UTRAN 130 and the EPC 199. The EPC 199 communicates with Packet Data Networks (PDNs) and servers in the outside world. FIG. 1 shows the key component parts of the EPC 199. It will be appreciated that FIG. 1 is a simplification and a typical implementation of LTE will include further components. In FIG. 1, interfaces between different parts of the LTE system are shown.

The E-UTRAN 130 comprises a plurality of eNBs (E-UTRAN Node B) 110 that is responsible for handling radio communications between the UE 100 and the EPC 199 across an air interface, Uu 105 (only on eNB is shown for simplicity). An eNB 110 controls UEs 100 in one or more cell. LTE is a cellular system in which the eNBs provide coverage over one or more cells. Typically, there is a plurality of eNBs 110 within an LTE system. In general, a UE 100 in LTE communicates with one eNB through one cell at a time.

Key components of the EPC 199 are shown in FIG. 1. It will be appreciated that in an LTE network there can be more than one of each component according to the number of UEs 100, the geographical area of the network and the volume of data to be transported across the network. Data traffic is passed between each eNB 110 and a corresponding Serving Gateway (S-GW) 150 which routes data between the eNB 110 and a PDN Gateway (P-GW) 160. The P-GW 160 is responsible for connecting a UE 100 to one or more servers or PDNs (not shown) in the outside world. A Mobility Management Entity (MME) 140 controls the high-level operation of the UE 100 through signaling messages exchanged with the UE 100 through the E-UTRAN 130. Each UE 100 is registered with a single MME 140. There is no direct signaling pathway between the MME 140 and the UE 100 (communication with the UE 100 being across the air interface 105 via the E-UTRAN 130). Signaling messages between the MME 140 and the UE 100 comprise EPS Session Management (ESM) protocol messages controlling the flow of data from the UE to the outside world and EPS Mobility Management (EMM) protocol messages controlling the rerouting of signaling and data flows when the UE 100 moves between eNBs 110 within the E-UTRAN 130 while in connected state (i.e. during "handover"), or moves between tracking areas (in idle/connected state) etc. The MME 140 exchanges signaling traffic with the S-GW 150 to assist with routing data traffic. The MME 140 also communicates with a Home Subscriber Server, HSS, (not shown) which stores information about users registered with the network.

Multicast user services, where the services can be supplied to more than one user simultaneously, are facilitated by Multimedia Broadcast Multicast Services, MBMS, in LTE.

MBMS services can be received by both active and idle UEs 100. Active UEs are those in an RRC_CONNECTED (Radio Resource Control Connected) state; while idle UEs are those in RRC_IDLE state.

MBMS has been developed to allow the synchronization of the delivery of multicast user services across a plurality of cells. The introduction of MBMS over Single Frequency Network (MBSFN) means that it is possible to simultaneously transmit identical information streams (both user plane and control plane) across more than one cell using the same radio frequency (if) carrier.

FIG. 1 also illustrates further network elements that facilitate the implementation of MBMS in LTE. Within the EPC 199, there is therefore an entity known as the MBMS Gateway, MBMS GW 170 and an entity known as a Broadcast Multicast Service Centre, BM-SC 180.

The BM-SC 180 is the point in the EPC 199 where the content for transmission via MBMS is inserted. The BM-SC 180 also manages the MBMS services by controlling star and stop procedures for MBMS sessions, allocating a session identity and a temporary mobile group identity (TMGI) to each MBMS session, specifying suitable quality of service (QoS) parameters to each session and transmitting MBMS data using the SYNC protocol (specified in 3GPP TS 25.446). MBSFN relies upon synchronization between the BM-SC 180 and each eNB 110.

The MBMS GW 170 is configured to allocate an IP multicast address for the transmission of MBMS data to participating eNBs 110, to transmit MBMS data using the allocated IP multicast address and to mediate in control plane signaling procedures between the BM SC and the radio access network, E-UTRAN 130. The IP multicast technique in MBMS allows a single transmission to send an IP packet to a plurality of receiving network nodes (i.e. eNBs) via the MBMS GW 170 to the cells where MBMS transmission is being provided (i.e. participating cells).

The E-UTRAN 130 comprises a multi-cell/multicast coordination entity, MCE 120. The MCE 120 can either be a standalone entity or a logical component of an eNB. In FIG. 1, the MCE 120 is shown as a standalone entity: typically, there would be a plurality of eNBs 110 each with a respective M2 interface 112 to the MCE in the standalone case, but this has been omitted for brevity. The (standalone) MCE 120 serves to ensure inter-eNB coordination of MBSFN transmissions and in particular coordinates the usage of the same radio resources in each cell of each MBSFN service area. Whether standalone or incorporated within respective eNBs 110, the MCE 120 operates to allocate radio resources (in both time and frequency domain) to MBMS data transmission, to control admission to those resources, to initiate the counting procedure (described in 3GPP TS 36.443), and based upon the results of the counting procedure to determine whether MBMS services should be delivered or not.

Figure 2:
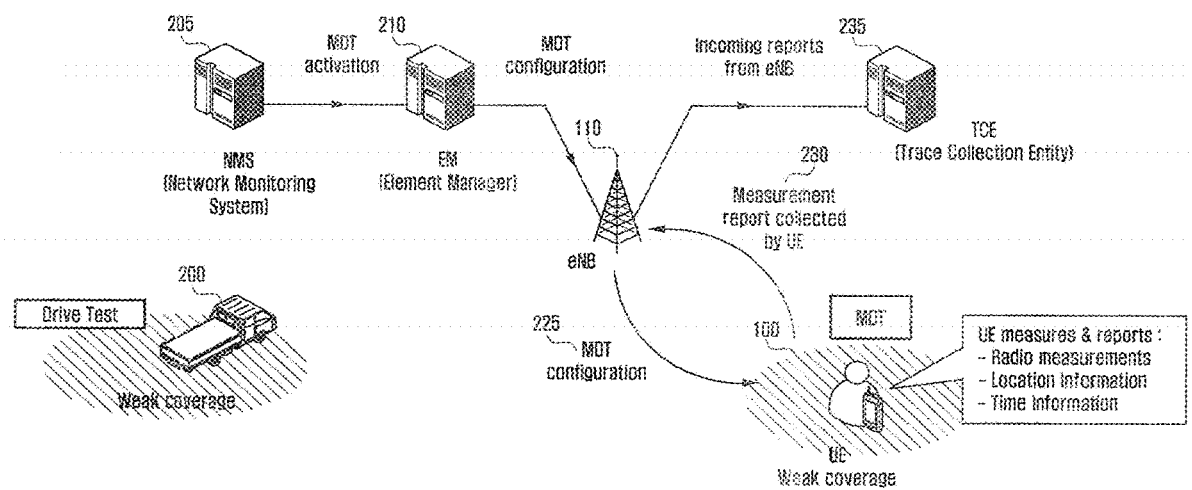
FIG. 2 is a diagram illustrating a communication system contrasting drive testing and Minimization of Drive Test (MDT) measurement according to this disclosure.

FIG. 2 is a diagram illustrating a communication system contrasting drive testing and Minimization of Drive Test (MDT) measurement.

Referring to FIG. 2, a typical drive test is performed in such a manner that a vehicle 200 carrying the measurement apparatus roams around the service areas to discover "shadow areas" (i.e. areas of limited effective radio coverage) and determines the signal condition. In MDT, however, User Equipment (UE) 100 performs the signal measurement instead of the vehicle-carried measurement apparatus. The Network Monitoring System (NMS) 205 can instruct the UE 100 to execute MDT. The NMS 205 provides the Element Manager (EM) 210 with any needed configuration information (regarding the type and details of the measurements to be performed). The EM 210 sends the MDT configuration information to the eNB 215. The eNB 215 sends (using RRC signaling) the MDT configuration information 225 to the UE 100 to instruct MDT: each UE being selected according to consent information, UE capability and presence within a target measurement area. This configuration information includes absolute reference time information, sampling cycle and a measurement duration. The UE 100 collects the MDT measurement information. The MDT measurement information includes the location (where available) and time information as well as measurement results from one or more Radio Access Technology, RAT. The collected information 230 is reported to the eNB 110. The eNB 110 sends the collected information to a Trace Collection Entity (TCE) 235. The TCE 235 is a server for collecting MDT measurement information.

The MDT measurement information includes radio condition measurement results (such as RSRP and RSRQ measurement results) perceived by the UE along with available location and time information associated with the radio measurements. The location information is optional and dependent upon the capabilities of the individual UE: the UE can have Global Navigation Satellite System, GNSS, information (e.g. from a GPS unit) and/or can collect radio frequency, RF, fingerprint information from a limited number of neighboring cells. Note that an RF fingerprint is not reported as part of the location information structure, rather the UE just reports available measurement results from neighboring cells, and a network entity computes a position from this. The GNSS/GPS based positioning is also referred to as "detailed" location information in the literature. The UE attaches the detailed location information, as determined when it became available during the last logging interval to ensure that the attached location information can still be considered valid.

For example, in connected mode, the UE substantially instantaneously reports the measurement results for MDT to the base station. As the reports are sent as they are generated, the base station is responsible for applying a time stamp to the measurement results. Where location information is available, the measurement report can have a field allowing the UE to append location information.

In idle mode, however, the UE logs the MDT data over a logging duration (durations of 10, 20, 40, 60, 90 and 120 minutes are typical) with an independently configured periodicity (the logging interval is typically set at a multiple of the idle mode discontinuous reception, DRX, cycle with currently supported values of 1.28, 2.56, 5.12, 10.24, 20.48, 30.72, 40.96 and 61.44 seconds) as specified in the received MDT configuration. Setting the logging interval at a multiple of the idle mode DRX cycle means that the UE performs measurements at times when the UE has left sleep mode to check for paging messages anyway. A UE configured for MDT logging (while in idle mode) would conventionally indicate presence of MDT log data to the base station during transitions to the connected mode. The base station then retrieves the MDT log data buffered by the UE during the idle mode using RRC signaling (i.e. using the UE Information Request message): in LTE, the UE could transfer the MDT log data to the base station using one or more messages (i.e. UE Information Response messages) in the information transfer procedure and henceforth to the MDT server (i.e. the TCE 235) for network optimizations. Where more than one message is needed, a flag can be included in the reporting message indicate presence of further MDT log data.

Figure 3:
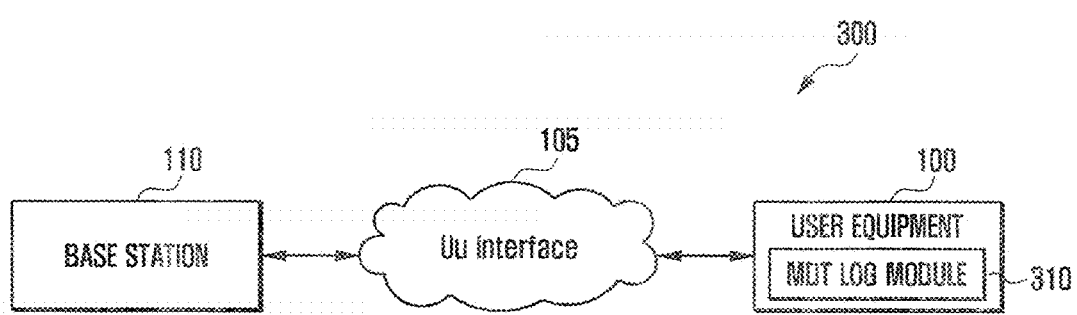
FIG. 3 illustrates a block diagram of a wireless communication system capable of providing minimization drive test (MDT) measurement information to a base station according to this disclosure.

FIG. 3 illustrates a block diagram of a wireless communication system 300 capable of providing MDT measurement information to a base station 110. In FIG. 3, the wireless communication system 300 includes a base station 110 and a user equipment (UE) 100 in communicative contact with the base station 110 via an air interface, Uu 105. The UE 100 includes a MDT log module 310 for providing the complete MDT measurement information to the base station 110. For example, the MDT measurement information includes radio measurement results associated with location and timing information. In certain embodiments, the MDT log module 310 also indicates availability of MDT measurement information to the base station 110, by including a flag (e.g. LogMeasAvailable) within the RRC signaling (i.e. in a RRC Connection Setup Complete Message, a RRC Connection Reconfiguration Complete Message and/or a RRC Connection Re-establishment Complete Message). In certain embodiments, UE Information Response messages can carry a similar flag to indicate that MDT measurement information is still available.

To support the verification of actual MBSFN signal reception as well as to support planning and reconfiguration of MBSFN areas and MBMS operation parameters, etc., it is contemplated to base the facility for gathering MBSFN UE measurements upon MDT.

It is noted that like conventional MDT, it is convenient that MBSFN UE measurements should also include UE geographical location. Logging of measurement results in idle mode comprises obtaining positioning information, taking measurements and storing the measurement results, together with the positioning information, for later provision to a base station by a UE log module. Furthermore, it is also assumed that:

1) The UE should log Quality of Service parameters, such as Reference Signal Received Power (RSRP)/Reference Signal Received Quality (RSRQ)/Block Error Rate (BLER) measurements of a particular MBSFN area, which is at a particular frequency. Conveniently the measurement of BLER is to be reported at a finer level than RSRP or RSRQ: that is to say, respective BLER measurements are performed for each one or more MCH and/or for each MCS of an MBSFN area.

2) The same MBSFN area identity can be re-used on another frequency in the same geographical area 3) The UE performs logging as follows:

As the UE requirements w.r.t. what measurement results the UE logs are specified rather loosely, it is specified that when the PLMN and areas scope checks pass and the logging duration has not elapsed, the UE performs logging of any available measurements of any frequency (including inter-RAT), up to a specified maximum number of cells per frequency.

The UE should not be required to receive additional MBMS subframes specifically for the purpose of the eMBMS measurement. It should only be required to determine a measurement result for, and to perform the logging of that result based on, subframes it is already receiving.

Note that the measurement logging applies when receiving MBMS subframes, irrespective of the camping/serving frequency(ies).

The procedures and signaling that allow UEs to perform idle mode measurement logging in E-UTRAN need to be extended to cover the logging of the eMBMS measurements.

One aspect of the extension of logged MDT to the logging of the eMBMS measurements is the handling of the MBSFN area. There are two ways to model the eMBMS measurement logging w.r.t. how the UE should handle the MBSFN area.

The MBSFN area can be explicitly specified as part of area scope ("Model A"). In this approach, the UE logs all available measurement results (i.e. while logging would include MBMS measurement results of subframes the UE is already receiving, the measurement logging is, in principle, not limited to MBMS measurements only, to any specific MBSFN area and/or to any particular frequency) provided the UE is within the public land mobile network, PLMN (i.e. the network of a given mobile network operator in a given territory), within the tracking area, TA, and/or cell list and within a MBSFN area specified by the area scope.

Thus, Model A ensures that the UE logs all measurements it can perform measurements upon provided it has first been determined that the current network configuration (e.g. the current PLMN, tracking area, cell list and/or MBSFN area) corresponds to configuration information specifying the target area.

Alternatively, the one or more MBSFN area specified in a new field of a UE MDT configuration indicating the requested measurements, often referred to as the "object" ("Model B"). In this alternative approach, the UE only logs MBMS measurements for the concerned MBSFN area/areas (each of which is on a particular frequency)—provided the UE is within the PLMN and within the TA and/or cell list.

Thus, Model B ensures that the UE logs a limited subset of MBMS measurements provided it has been determined that the current network configuration (e.g. the current PLMN, tracking area, and/or cell list) corresponds to configuration information including the new field indicating the requested measurements.

Model A has the advantage that it is aligned with conventional logged MDT. On the downside, it can result in more extensive logging. Note that logging is loosely specified in the known MDT framework, and largely up to implementation.

Model B has the advantage that the logging performed by the UE can be restricted to measurements of interest.

Both models are contemplated so the UE should consider the MBSFN area either as: MBSFN area specified as part of area scope (Model A) or MBSFN area specified as part of the "object" (Model B).

In the case of model B, however, certain embodiments extend the fields defining requested measurements in logged eMBMS measurement to cover the following more detailed options: an indication that the requested measurements concern one or more (entire) MB SFN area; and an indication that the requested measurements concern one or more particular multicast channel, MCH, (i.e. a transport layer channel) or a particular Modulation and Coding Scheme, MCS, (of an MBSFN area).

Both options for Model B require the specification of an additional configuration parameter, i.e. an MCH, an MCS or a list of MCHs. The list of MCHs implies a given MCS also, and can hence be regarded as the most general specification option. Furthermore, a separate configuration bit (flag) can be introduced by which E-UTRAN can configure whether the UE should separately log the measurement of the subframes using the MCS configured for signaling (i.e. as defined by field signalingMCS within a SystemInformationBlockType13).

Certain embodiments therefore extend the fields defining requested measurements in logged eMBMS measurement to introduce the configuration parameters for the following: a list of one or more MCH and/or an indicator flag.

The list of one or more MCH specifies the one or more MCH and/or the MCS for which the UE should provide an averaged eMBMS measurement result. Alternatively, an MCS value could be configured to specify the one or more MCH for which the UE should provide eMBMS measurement results.

This field, specifying the MCS or the one or more MCH, could in one case only restrict the subframes the UE is requested to consider when determining the BLER value(s) for user data, or in another case restrict the subframes the UE should consider when determining the RSRP and RSRQ value to log.

The indicator flag is a field indicating whether the UE should separately provide a result for the subframes using the MCS configured for signaling. The UE selectively reports BLER measurement results, i.e. only if a list of MCH is configured. Rather than reuse the above separate provision flag, the configuration can be further extended to provide a further indicator/flag to indicate selective reporting of BLER measurement results.

It is further noted that on the radio (Uu) interface, the MBSFN area configuration is identified by means of a short (8 b) identifier that is unique on a particular frequency within a geographical area (i.e. an integer in the range 0 to 255 as indicated by field mbsfn-AreaId within a SystemInformationBlockType13). As the MBSFN area identity is only 8 bits, there can be a need to re-use the same value multiple times within a Tracking Area.

The or each MCH is assumed to be identified by means of an index, i.e. identifying the entry of the concerned MCH within field PMCH-InfoList in the MBSFNAreaConfiguration message.

Figure 4:
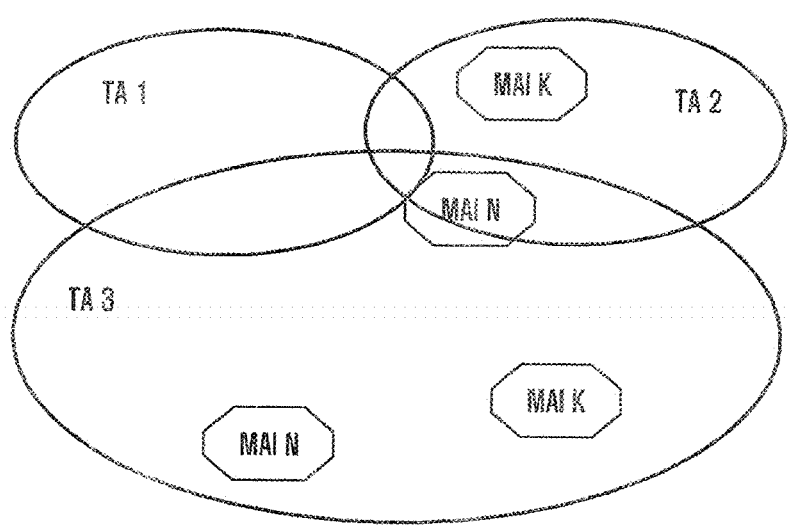
FIG. 4 illustrates diagrammatically the relationship between the cells of a cellular network and the MBMSFN service areas provided within those cells according to this disclosure.

Note too that MBSFN areas can be of varying size (as illustrated in FIG. 4). Some MBSFN Area Identifiers can cover an entire region while other MBSFN areas could comprise one or a few cells E-UTRAN. In certain embodiments, separate value ranges of MBSFN Area Identifiers are reserved for such small MBSFN areas and re-use of MBSFN Area Identifiers within a Tracking Area is limited to values reserved for small MBSFN areas.

Consider the situation illustrated in FIG. 4: the network configures logging for MBSFN Area with Identity N (MAI N).

This MBSFN area is entirely within the coverage of TA3, but unfortunately its identity is not unique within TA3. The MBSFN area does however extend beyond the coverage of TA1 and TA2. In cases where the MBSFN area comprises a significant number of cells, it may not be possible to specify the area configuration by means of a cell list either. It can however be possible to specify the coverage area by means of a combination of TA2 and a few cells.

For this reason, certain embodiments require the area configuration by means of a combination of TAs and cells.

As a result, these embodiments have improved flexibility in UE measurement reporting (and in particular with respect to MBMS and/or the use of MBSFN areas) Logging can be reduced or even entirely avoided in unwanted MBSFN areas. It is however noted that the same can be achieved by configuring certain UEs to perform logging of MAI N in TA2 and certain other UEs to perform logging of MAI N for a limited set of cells in TA3.

As mentioned above, logged MDT includes a procedure for indicating availability of logged measurement information to the base station (e.g. the LogMeasAvailable flag). This indication procedure can be re-used for MBMS measurement reporting—with the possible risk that the indication procedure can, on some occasions, flag the presence of data that is of no use in retrieving UE measurements for MBMS.

In addition to the extension of the procedures for indicating availability of, and for retrieval of, logged measurement information, discussed above, the procedures for measurement logging also need to be extended to cover the logging of the eMBMS measurements. Likewise, the signaling needs to be extended both for availability indication as well as for the actual transfer of the logged measurement information.

In certain embodiments, UEs that are configured to perform logging measurement of eMBMS measurements are arranged only to determine measurement results and to log the results when they are actually receiving sub-frames carrying either the particular MCH(s) (in cases where the measurement object concerns an entire MBSFN area), or sub-frames carrying any MCH using the concerned MCS (in cases the measurement object concerns a particular MCH or a particular MCS (of an MBSFN area)). In other words, it is contemplated that the UE should not be required to receive additional MBMS subframes (which they would otherwise not be receiving) specifically for the purpose of logging the eMBMS measurement results (i.e. in accordance with the general MDT principle that the UE is only required to log available measurements).

When considering what information to log when configured to log eMBMS measurements, certain embodiments extend the current MDT reporting information structure to support the eMBMS measurement. This implies that when performing eMBMS measurement logging, the UE will include any fields that are currently mandatory even though they may not be relevant or essential for the eMBMS measurement. Accordingly, certain embodiments require the UE periodically to log: a time stamp, GNSS/GPS location information (if available) and the serving cell measurement. The information the UE logs in addition to this depends on the eMBMS measurement logging model adopted.

If Model A is adopted (i.e. MB SFN area specified as part of area scope), the UE performs logging of all available measurements, provided PLMN check, logging duration and logging areas scope checks pass (now including MB SFN area). According to conventional MDT practice, no details are specified regarding what the UE shall/shall not include: meaning the UE includes MBMS measurement results covering all MBMS subframes received, i.e. of any MBSFN areas and of any MBMS frequency but it can also log available non-MBMS measurements according to current MDT practice.

If, however, Model B is adopted (i.e. MBSFN area specified as logged measurement object) the UE performs logging of the measurement results confined to a subset of the MBMS subframes that are received, those subframes being of the type indicated by the measurement object—provided PLMN check, logging duration and logging areas scope checks pass.

Certain embodiments place additional restrictions in logging when adopting Model A. When specifying the MBSFN area, it seems preferable to avoid the logging of available measurement results of E-UTRA and inter-RAT neighboring cells, with the exception that a few intra-frequency neighbors can be useful in case detailed location information (GPS) is not available. A suitable logging restriction can be to allow the UE to omit available neighboring cell measurements, with the possible exception for a limited number of intra-frequency neighbors when detailed location is not included (for RF fingerprinting).

While the procedural specifications may not specify in detail what eMBMS measurement information the UE should log, the information structure will define this implicitly. As such when adopting Model A, the UE should log the following eMBMS measurements: one set of measured results for RSRP & RSRQ per MBSFN area, while for BLER one set of measured results per MCH or MCS (in the MB SFN area) for which user and/or control data was received in this logging interval. As noted previously, there may be more than one MCH and/or MCS for any given MBSFN area.

Certain other embodiments place additional restrictions in logging when adopting Model B. Current measurement logging procedures do not use a measurement object as a concept so handling for the case the MBSFN area is specified as logged measurement object is entirely new. In this case, the procedural specification can be defined to include more details on what eMBMS information the UE should log. Certain embodiments require that the UE should log the only certain information, restricted to the one or more MBSFN areas for which eMBMS measurement logging is configured. This logged information includes measured results per MBSFN area: for each logged MBSFN area and for the one or more MCH for which measurement logging is specified (possibly indirectly by the MCS), a list with one set of measured results per MCH (for each MCH for which user data was received in this logging interval); and (optionally or where configured to do so) the measurement result for the subframe(s) using signaling MCS, if received during this subframe.

Clearly the situation where no (proper) measurement result is available needs to be considered. Where the UE fails (for whatever reason) to obtain a proper measurement result for a particular logging interval, certain embodiments require the UE either not to report anything for the concerned logging interval or to log a value specifically reserved to indicate absence of a reliable measurement result. Failure may occur, for example, when the UE was unable to receive the MBSFN area, the UE failed to receive the service of interest, the UE lost interest, the UE received insufficient samples to meet the defined performance requirements, etc. This is reflected by the following:

To provide suitable logging when no proper measurement is available for a particular logging interval, the UE may be required to perform one of the following: to log a reserved value specifically defined for this purpose, possibly a value reflecting the specific problem; to log no eMBMS measurement results for this interval (but optionally to log other information such as time stamp and location information); to log nothing for this interval.

In cases where the UE attempted to receive some sub-frames, but failed to receive any sub-frame, the BLER may be considered to be 100%.

Certain embodiments distinguish between causes for failure to obtain a proper measurement result for a particular logging interval. In particular, a first indication can be provided that a physical signal fell below some level (i.e. corresponding with out of service area) and a second, different, indication can be provided that the physical signal lay above this level but some other error occurred, e.g. CRC error.

Figure 5:
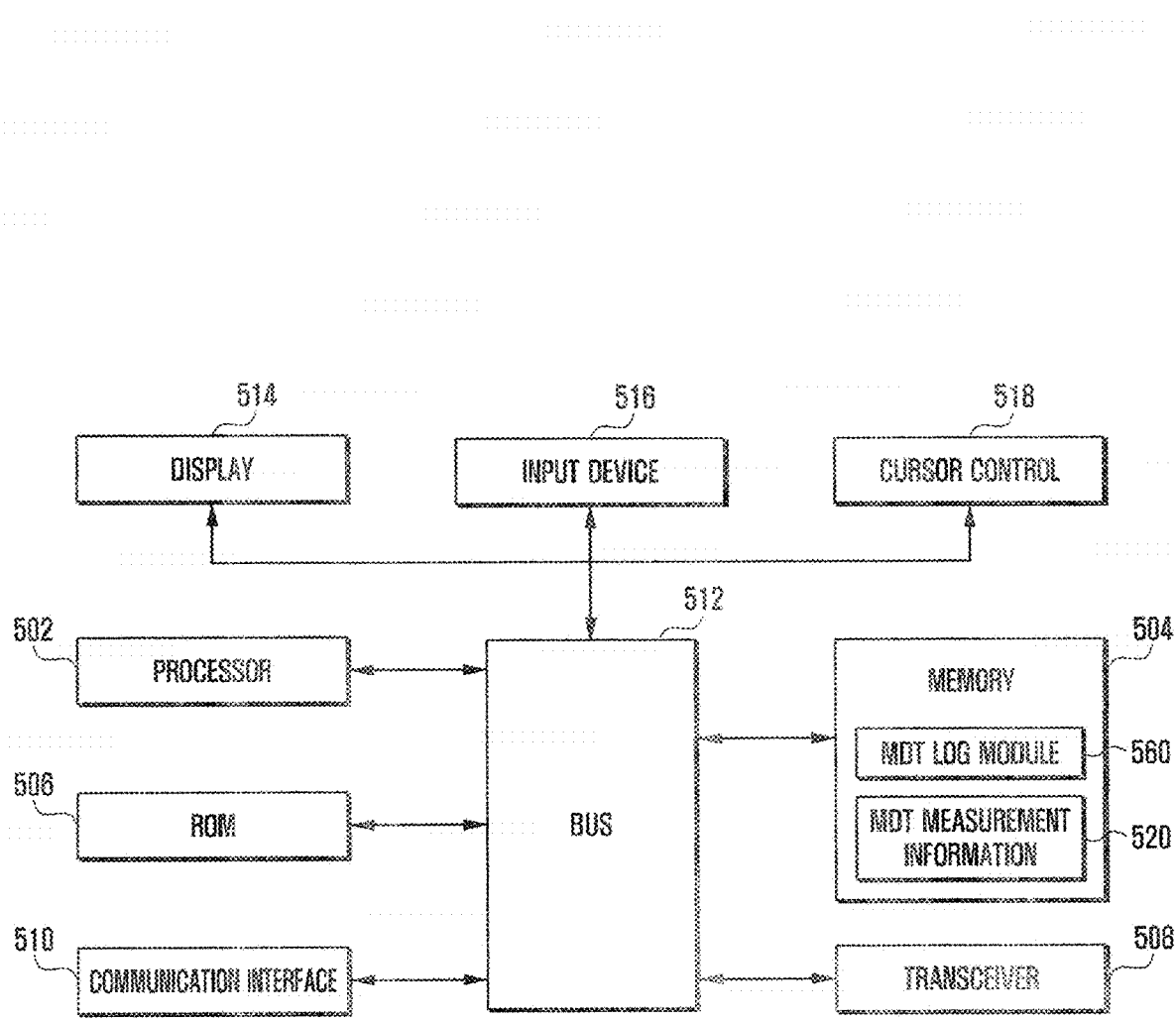
FIG. 5 illustrates a block diagram of the user equipment showing various components for implementing embodiments of the present subject matter according to this disclosure.

FIG. 5 illustrates a block diagram of the UE 100 showing various components for implementing embodiments of the present subject matter. In FIG. 5, the UE 100 includes a processor 502, memory 504, a read only memory (ROM) 506, a transceiver 508, a bus 510, a communication interface 512, a display 514, an input device 516, and a cursor control 518.

The processor 502, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 502 also includes embedded controllers, such as generic or programmable logic devices or arrays, application specific integrated circuits, single-chip computers, smart cards, and the like.

The memory 504 can be volatile memory and non-volatile memory. In this embodiment, the memory 504 includes a MDT log module 560 in the form of instructions stored therein to provide the complete MDT measurement information 520 logged in the UE 100 to the base station 110. In alternative embodiments, the log module 560 can be implemented as a hardware component of the UE 100, corresponding to the log module 310 illustrated in FIG. 3. A variety of computer-readable storage media can be stored in and accessed from the memory elements. Memory elements can include any suitable memory device(s) for storing data and machine-readable instructions, such as read only memory, random access memory, erasable programmable read only memory, electrically erasable programmable read only memory, hard drive, removable media drive for handling memory cards, Memory Sticks[®], and the like.

Changes to the MDT message flows/signaling resulting from the logging of eMBMS measurement results are now considered in more detail. The signaling is based upon the conventional E-UTRA Radio Resource Control (RRC) protocol specification (as set out in 3GPP TS 36.331). Certain embodiments re-use and/or extend the procedures specified in TS 36.331 at the following sections:

5.3.3—RRC connection establishment (indication of available logged measurement info)

5.3.5.4—Reception of an RRCConnectionReconfiguration including the mobilityControlInfo by the UE (handover) (indication of available logged measurement info)

5.3.7—RRC connection re-establishment (indication of available logged measurement info)

5.6.5—UE Information (retrieval of available logged measurement info)

5.6.6—Logged Measurement Configuration (setting of configuration for measurement logging)

Figure 6:
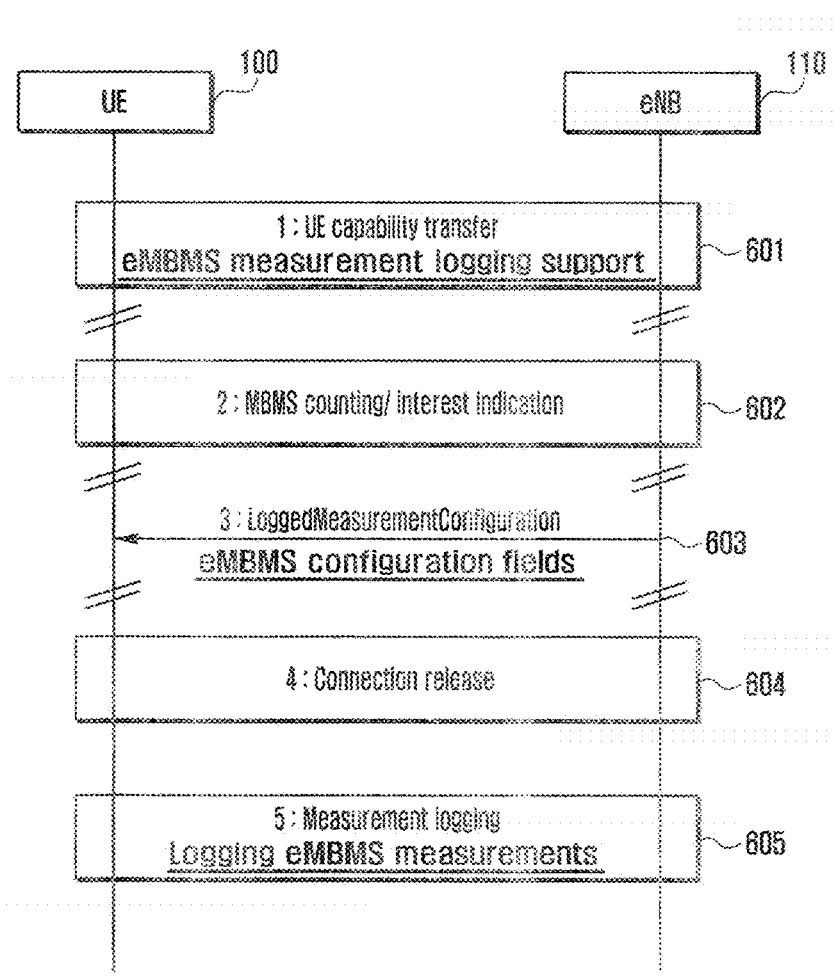
FIG. 6 illustrates the basic message sequence for the initial configuration of the UE for eMBMS measurement logging according to this disclosure.

FIG. 6 illustrates the basic message sequence for the initial configuration of the UE for eMBMS measurement logging, also showing the subsequent logging upon entering idle mode. FIG. 6 (together with the description below) clarifies the changes introduced in certain embodiments: these changes are highlighted in BOLD (and lined).

At step 601 the UE indicates supports of eMBMS measurement logging while transferring UE capability information. Conveniently, at step 602, the E-UTRAN can use information exchanged during MBMS counting/MBMS interest indication when selecting which MBMS UEs to configure for measuring a particular MBSFN area.

The UE is then configured to perform eMBMS measurement logging, step 603; for instance, this logging can be required (for BLER) for a particular MCH or an MBSFN area information.

At step 604, the connection is released and the UE moves to idle mode. Finally, while 1) in idle mode, 2) in the particular MBSFN area, and 3) receiving MBMS subframes concerning the particular MCH/MBSFN area, the UE logs the eMBMS measurement results, step 605.

Figure 7:
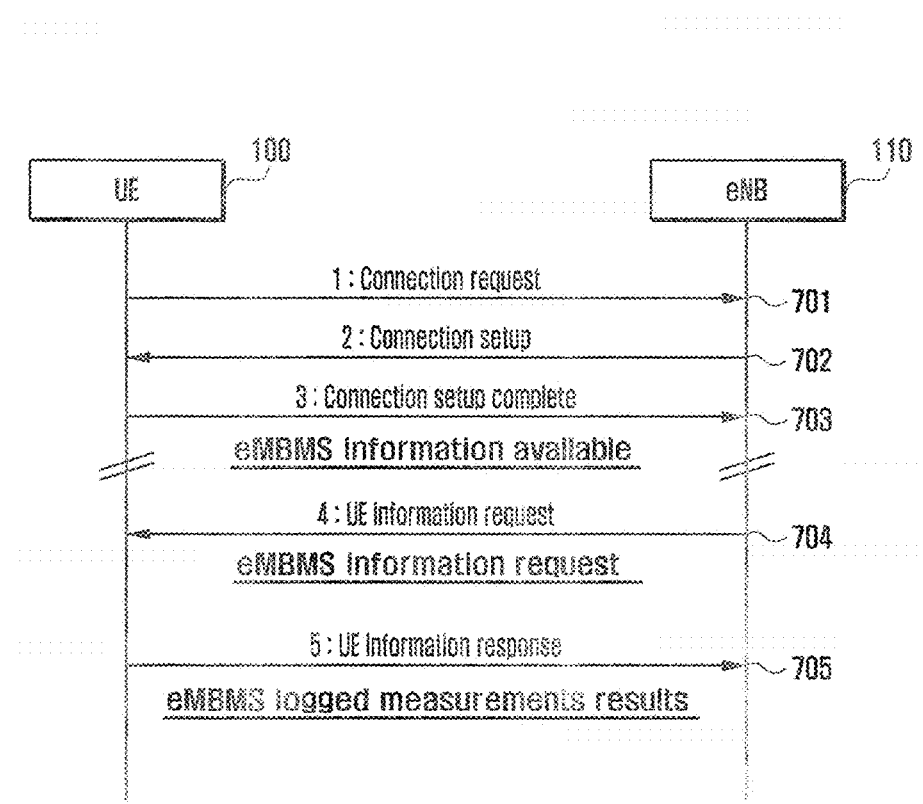
FIG. 7 illustrates the basic message sequence for the indication by the UE that it has logged eMBMS measurement information available according to this disclosure.

FIG. 7 illustrates the basic message sequence for the indication by the UE that it has logged eMBMS measurement information available and the subsequent retrieval of this information by E-UTRAN. FIG. 7 (together with the description below) clarifies the changes introduced in certain embodiments: these changes are highlighted in BOLD (and lined).

Steps 701 and 702 of FIG. 7 show the respective conventional procedures for requesting and then setting up a connection between UE 100 and eNB 110. At step 703, once connection setup is complete, the UE indicates availability of the eMBMS logged measurement information.

At step 704, E-UTRAN requests the UE to provide the eMBMS logged measurement information. In certain embodiments, the request for such information is a component of a combined request for logged measurement and other information.

The UE provides a (part of the) requested eMBMS logged measurement information to the E-UTRAN, step 705. Steps 704 and 705 can be repeated a number of times to retrieve the entire set of logged measurement information: this may be necessary, for example when more measurement information has been logged than can be encapsulated in a single reporting message.

As discussed above, logged measurement configuration for the case MBSFN area can be specified as part of area scope (Model A). The following table, Table 1, illustrates the logged MDT measurement configuration, as specified by means of field loggedMeasurementConfiguration within the LoggedMeasurementConfiguration message [directed from E-UTRAN (i.e. eNB) to UE].

TABLE 1

| Item | Field | Description |
|---|---|---|
| 1 | Area Configuration | Extended in REL-12 with the following optional fields |
| 1.1 | >MBSFN area identity list | Used to specify area by means of TA list and/or cell list and one or more MBSFN area |
| 1.2 | >Cell list | Used to specify an area covering one or more TAs and one or more cells (i.e. combination). Could also be used to realise longer cell lists |

An illustration of how this could be introduced in the PDU specification is given in an example extract of the ASN.1, see FIG. 8.

As discussed above, logged measurement configuration for the case MBSFN area can be specified as part of the object (Model B). Table 2, below, illustrates the logged MDT measurement configuration, as specified by means of field loggedMeasurementConfiguration within the LoggedMeasurementConfiguration message [directed from E-UTRAN (i.e. eNB) to UE].

TABLE 2

| Item | Field | Description | Notes |
|---|---|---|---|
| 1 | Requested measurements | CHOICE | Optional |
| 1.1 | >MBSFN area list | Used to specify that the UE shall only log eMBMS measurements concerning one or more MBSFN areas | |
| 1.1.1 | >>Carrier frequency | Used to specify the frequency of the MBSFN areas which measurements the UE shall log | Mandatory |
| 1.1.2 | >>MBSFN area identity | Used to specify the MBSFN area for which the UE shall log available measurements | Mandatory |
| 1.1.2.1 | >>>List of MCH | Per MBSFN area, a list of one or more MCH indices (pointers to MCCH). Used to specify the one or more MCH for which the UE shall log available BLER measurements | Optional |
| 1.1.2.2 | >>LogSignalling | Per MBSFN area, a bit/flag to indicate whether the UE shall separately log the eMBMS measurement result for subframes using the MCS specified for signalling | Optional |

An illustration of how this could be introduced in the PDU specification is given in an example extract of the ASN.1, see FIG. 9.

Table 3 below illustrates the structure of a logged eMBMS measurement report based on that in MDT.

TABLE 3

| Item | Field | Description | Notes |
|---|---|---|---|
| 1 | Requested measurements | CHOICE | Optional |
| 1.1 | >MBSFN area list | Used to specify that the UE shall only log eMBMS measurements concerning one or more MBSFN areas | |
| 1.1.1 | >>Carrier frequency | Used to specify the frequency of the MBSFN areas which measurements the UE shall log | Mandatory |
| 1.1.2 | >>MBSFN area identity | Used to specify the MBSFN area for which the UE shall log available measurements | Mandatory |
| 1.1.2.1 | >>>List of MCH | Per MBSFN area, a list of one or more MCH indices (pointers to MCCH). Used to specify the one or more MCH for which the UE shall log available BLER measurements | Optional |
| 1.1.2.2 | >>LogSignalling | Per MBSFN area, a bit/flag to indicate whether the UE shall separately log the eMBMS measurement result for subframes using the MCS specified for signalling | Optional |

Table 4 below summarizes the changes to various RRC messages including the information structure of the eMBMS measurement requests, logged eMBMS measurement results reported by the UE, the UE capability Information report message and signaling relating to the configuration, such as availability of logged measurements. It is assumed that the eMBMS measurements will be supported by extending the IE LogMeasInfo that is transferred within field LogMeasReport within the UEInformationResponse message: this message is directed from UE to E-UTRAN.

Further signaling changes (i.e. other than configuration) may be needed to reflect UE capability and these are set out below.

TABLE 4

| Message | Field/nesting | Item added | Description |
|---|---|---|---|
| UECapabilityInformation | UE-EUTRA-Capability >ue-BasedNetwPerfMeasParameters >>loggedMeasurementsIdle | loggedMeasurementsIdle-eMBMS | Indicates support of eMBMS measurement logging |
| RRCConnectionReconfiguration Complete RRCConnectionReestablishment Complete RRCConnectionSetup Complete UEInformationResponse >logMeasReport | >logMeasAvailable | >logMeasAvailable-eMBMS | Indicates availability of eMBMS logged measurement information |
| UEInformationRequest | logMeasReportReq | logMeasReportReq-eMBMS | Request to provide eMBMS logged measurement results |
| UEInformationResponse | >logMeasReport >>logMeasInfoList >>>logMeasInfo | mbsfn-AreaInfoList >measResult-eMBMS-Sig >mchInfoList >>measResult-eMBMS | Per MBSFN area: RSRP and RSRQ measurement result BLER measurement result for signaling (if configured) BLER measurement result per MCH |

It will be appreciated that embodiments of the present disclosure can be realized in the form of hardware, software or a combination of hardware and software. Any such software can be stored in the form of volatile or non-volatile storage, for example, a storage device like a ROM, whether erasable or rewritable or not, or in the form of memory, for example, RAM, memory chips, device or integrated circuits or on an optically or magnetically readable medium, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure. Accordingly, embodiments provide a program comprising code for implementing apparatus or a method as claimed in any one of the claims of this specification and a machine-readable storage storing such a program. Still further, such programs can be conveyed electronically via any medium including a communication signal carried over a wired or wireless connection and embodiments suitably encompass the same.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics described in conjunction with a particular aspect, embodiment or example of the disclosure are to be understood to be applicable to any other aspect, embodiment or example described herein unless incompatible therewith. All of the features disclosed in this specification (including any accompanying claims, abstract and drawings), and/or all of the steps of any method or process so disclosed, can be combined in any combination, except combinations where at least some of such features and/or steps are mutually exclusive. Embodiments of the present disclosure are not restricted to the details of any foregoing embodiments. Embodiments of the present disclosure extend to any novel one, or any novel combination, of the features disclosed in this specification (including any accompanying claims, abstract and drawings), or to any novel one, or any novel combination, of the steps of any method or process so disclosed. It will be also be appreciated that, throughout the description and claims of this specification, language in the general form of "X for Y" (where Y is some action, activity or step and X is some means for carrying out that action, activity or step) encompasses means X adapted or arranged specifically, but not exclusively, to do Y.

The reader's attention is directed to all papers and documents which are filed concurrently with or previous to this specification in connection with this application and which are open to public inspection with this specification, and the contents of all such papers and documents are incorporated herein by reference.

Although the present disclosure has been described with an exemplary embodiment, various changes and modifications may be suggested to one skilled in the art. It is intended that the present disclosure encompass such changes and modifications as fall within the scope of the appended claims.

Thus, while the embodiments described above relate primarily to release 12 (REL-12) and beyond of the Evolved Universal Terrestrial Radio Access (E-UTRA). However, the reader will readily appreciate that application of the solutions described above may equally be extended to other releases of 3GPP standards and indeed to other (radio access) systems without significant adaptation.

What is claimed is:

1. A method performed by a terminal in a wireless communication system, the method comprising:
   receiving, from a base station, configuration information including a multicast broadcast single frequency network (MBSFN) area identifier and frequency information, the MBSFN area identifier specifying an area for the terminal to perform measurement logging and the frequency information specifying a frequency for the terminal to perform measurement logging;
   identifying an MBSFN area in which the terminal is to receive a multimedia broadcast multicast service (MBMS) based on the configuration information;
   performing MBMS measurement logging for the MBSFN area; and
   transmitting, to the base station, logged MBMS measurement information,
   wherein the logged MBMS measurement information includes a data block error rate (BLER) result list including a data BLER result per multicast channel (MCH) using a data modulation coding scheme (MCS) and a MCH index associated with the data BLER result in case that the BLER result is available.

2. The method of claim 1, wherein the logged MBMS measurement information includes a reference signal received power (RSRP) and a reference signal received quality (RSRQ).

3. The method of claim 1, wherein the configuration information further includes at least one of a logging duration, a logging interval, area information, or information on a public land mobile network (PLMN), and
   wherein the terminal is not required to log inter-radio access technology (RAT) measurement information in case that the configuration information is received.

4. The method of claim 3, wherein the MB SFN area identifier includes at least one of cell identities or a tracking area.

5. The method of claim 3, further comprising, in case that no measurement information is available for the logging interval, omitting to perform the MBMS measurement logging for the logging interval.

6. A method performed by a base station in a wireless communication system, the method comprising:
   transmitting, to a terminal, configuration information including a multicast broadcast single frequency network (MB SFN) area identifier and frequency information, the MB SFN area identifier specifying an area for the terminal to perform measurement logging and the frequency information specifying a frequency for the terminal to perform measurement logging; and
   receiving, from the terminal, logged multimedia broadcast multicast service (MBMS) measurement information for an MB SFN area,
   wherein the logged MBMS measurement information includes a data block error rate (BLER) result list including a data BLER result per multicast channel (MCH) using a data modulation coding scheme (MCS) and a MCH index associated with the data BLER result in case that the BLER result is available.

7. The method of claim 6, wherein the logged MBMS measurement information includes a reference signal received power (RSRP) and a reference signal received quality (RSRQ).

8. The method of claim 6, wherein the configuration information further includes at least one of a logging duration, a logging interval, or information on a public land mobile network (PLMN),
   wherein inter-radio access technology (RAT) measurement information is not logged in case that the configuration information is transmitted, and
   wherein the MB SFN area identifier includes at least one of cell identities or a tracking area.

9. The method of claim 8, wherein, in case that no measurement information is available for the logging interval, performing MBMS measurement logging is omitted for the logging interval.

10. A terminal in a wireless communication system, the terminal comprising:
    a transceiver; and
    a controller configured to:
       receive, from a base station via the transceiver, configuration information including a multicast broadcast single frequency network (MB SFN) area identifier and frequency information, the MB SFN area identifier specifying an area for the controller to perform measurement logging and the frequency information specifying a frequency for the controller to perform measurement logging, identify an MBSFN area in which the terminal is to receive a multimedia broadcast multicast service (MBMS) based on the configuration information, perform MBMS measurement logging for the MBSFN area, and transmit, to the base station via the transceiver, logged MBMS measurement information, wherein the logged MBMS measurement information includes a block error rate (BLER) result list including a data BLER result per multicast channel (MCH) using a data modulation coding scheme (MCS) and a MCH index associated with the data BLER result in case that the data BLER result is available.

11. The terminal of claim 10, wherein the logged MBMS measurement information includes a reference signal received power (RSRP) and a reference signal received quality (RSRQ).

12. The terminal of claim 10, wherein the configuration information further includes at least one of a logging duration, a logging interval, area information, or information on a public land mobile network (PLMN), and wherein the controller is not required to log inter-radio access technology (RAT) measurement information in case that the configuration information is received.

13. The terminal of claim 12, wherein the MBSFN area identifier includes at least one of cell identities or a tracking area.

14. The terminal of claim 12, wherein the controller, in case that no measurement information is available for the logging interval, is configured to omit performing the MBMS measurement logging for the logging interval.

15. A base station in a wireless communication system, the base station comprising:

a transceiver; and a controller configured to:

transmit, to a terminal via the transceiver, configuration information including a multicast broadcast single frequency network (MBSFN) area identifier and frequency information, the MB SFN area identifier specifying an area for the terminal to perform measurement logging and the frequency information specifying a frequency for the terminal to perform measurement logging, and receive, from the terminal via the transceiver, logged multimedia broadcast multicast service (MBMS) measurement information for an MBSFN area, wherein the logged MBMS measurement information includes a data block error rate (BLER) result list including a data BLER result per multicast channel (MCH) using a data modulation coding scheme (MCS) and a MCH index associated with the data BLER result in case that the data BLER result is available.

16. The base station of claim 15, wherein the logged MBMS measurement information includes a reference signal received power (RSRP) and a reference signal received quality (RSRQ).

17. The base station of claim 15, wherein the configuration information further includes at least one of a logging duration, a logging interval, or information on a public land mobile network (PLMN), wherein inter-radio access technology (RAT) measurement information is not logged in case that the configuration information is transmitted, and wherein the MB SFN area identifier includes at least one of cell identities or a tracking area.

18. The base station of claim 17, wherein, in case that no measurement information is available for the logging interval, performing MBMS measurement logging is omitted for the logging interval.

19. A non-transitory computer readable medium comprising a plurality of instructions that, when executed by one or more processors, causes the one or more processors to:

communicate with a base station;

receive, from the base station via a transceiver, configuration information including a multicast broadcast single frequency network (MBSFN) area identifier and frequency information, the MB SFN area identifier specifying an area for the one or more processors to perform measurement logging and the frequency information specifying a frequency for the one or more processors measurement logging;

identify an MBSFN area in which a terminal is to receive a multimedia broadcast multicast service (MBMS) based on the configuration information;

perform MBMS measurement logging for the MBSFN area; and transmit, to the base station via the transceiver, logged MBMS measurement information, wherein the logged MBMS measurement information includes a data block error rate (BLER) result list including a data BLER result per multicast channel (MCH) using a data modulation coding scheme (MCS) and a MCH index associated with the data BLER result in case that the BLER result is available.

20. The non-transitory computer readable medium of claim 19, wherein in case that the configuration information is received the plurality of instructions are configured to cause the one or more processors to not log neighboring cell measurement.

* * * * *